June 7, 1949.　　　D. B. McRAE ET AL　　　2,472,605
METHOD OF DEPOSITING OPTICAL INTERFERENCE COATINGS
Filed April 15, 1946
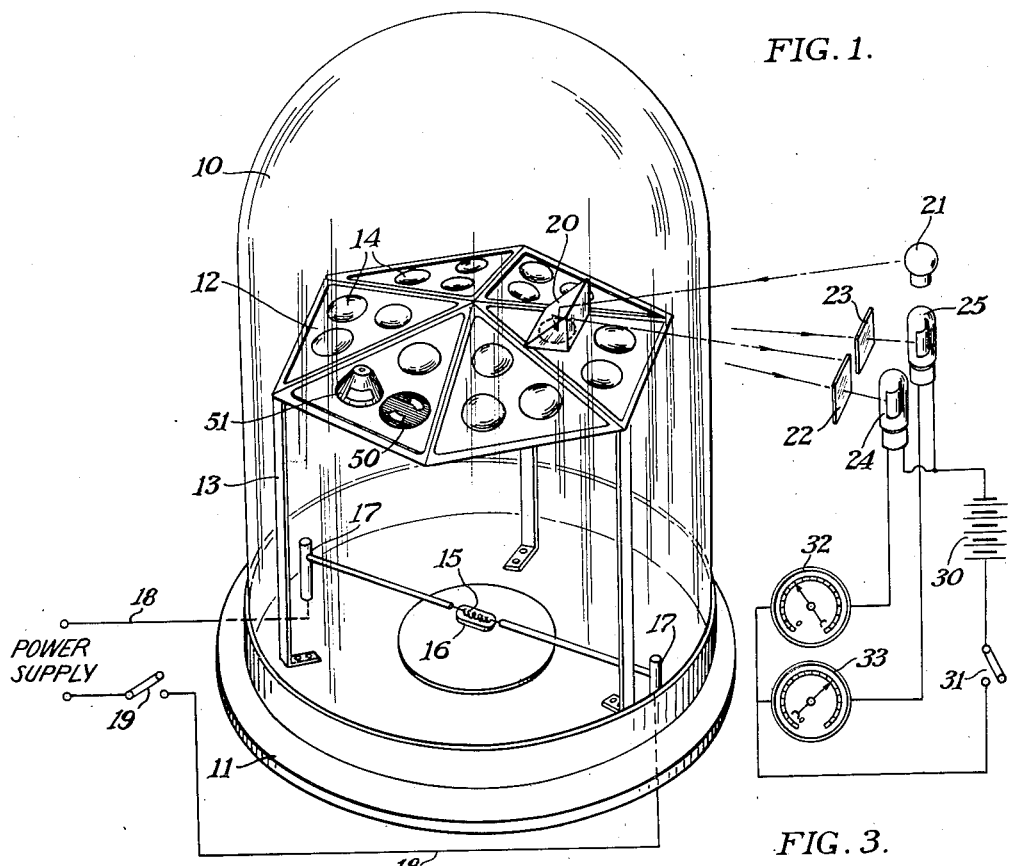
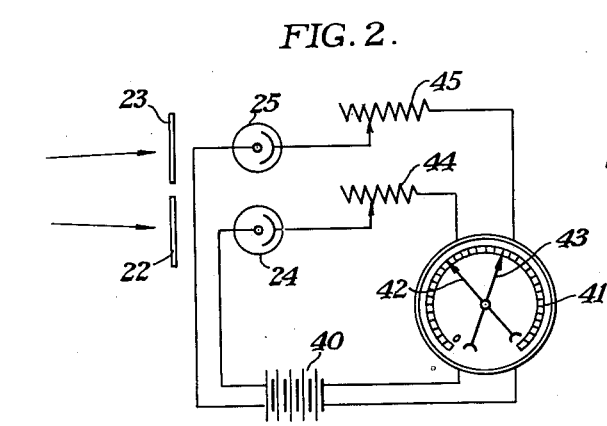
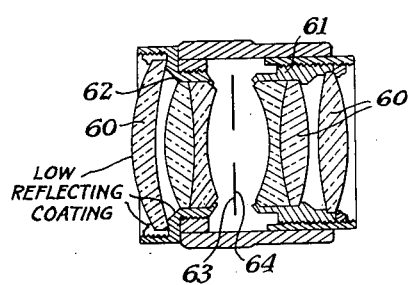
DANIEL B. McRAE
JOHN H. McLEOD
INVENTORS
BY
ATT'Y & AG'T Patented June 7, 1949

2,472,605

UNITED STATES PATENT OFFICE 2,472,605

METHOD OF DEPOSITING OPTICAL INTERFERENCE COATINGS

Daniel B. McRae, San Diego, Calif., and John H. McLeod, Rochester, N. Y., assignors to Eastman Kodak Company, Rochester, N. Y., a corporation of New Jersey Application April 15, 1946, Serial No. 662,182

1 Claim. (Cl. 117—106)

This invention relates to apparatus and processes for the formation of low reflectance optical interference coatings on glass and other materials.

It is the object of the invention to provide a simple precise method and apparatus for controlling the thickness of the interference layer. For example, it is known that maximum efficiency throughout the visible spectrum is obtained when the layers have a minimum reflectance in the green so that the apparent reflected hue is purple. Similarly a coating having a minimum reflectance in the violet or ultra-violet has a tan hue in the visible. The present invention involves certain spectral sensitivities relative to the wavelength of minimum relative intensity. Actually the reflectance vs. wavelength curve is undulating but the important minimum is the "first" or longest wavelength one and this is the only minimum here considered. The term "minimum intensity wavelength" will therefor by definition refer only to this longest wavelength minimum.

It is also an object of a preferred embodiment of the invention to reduce the reflection from opaque parts of an optical system such as the lens mount, the diaphragm, the shutter etc.

According to the invention, the object whose surface is to be coated is supported in the usual way and the coating material is deposited gradually on the required surface. Usually there are a number of such surfaces being coated simultaneously and observations according to the invention are made only on one of the surfaces which thus acts as a monitor for the rest. This is particularly useful in cases where the surfaces to be coated are opaque, in which case a transparent material is used as a monitor. The surface to be observed is illuminated with light which necessarily includes wavelengths both longer and shorter than the minimum intensity wavelength of the desired coating thickness. A pair of photoelectric cells or other photoelectric means are positioned to receive the light reflected from the illuminated surface, one of the cells being responsive predominately to the longer wavelengths and the other being responsive predominately to the wavelengths shorter than the minimum intensity wavelength. As the gradual deposition of the coating material proceeds the output of the short wavelength cell decreases more rapidly than that of the long wavelength cell until the coating reaches the thickness at which the short wave reflectance is a minimum as measured by the short wave photocell. After this point has been reached the output of the short wavelength cell increases while that of the longer wavelength cell continues to decrease. The coating operation is terminated when the relative response of the two cells reaches a predetermined value, after the short wavelength cell passes through the minimum. Preferably the response factors of the two cells are adjusted, for example by suitable resistances, until the responses are equal when the desired coating thickness is reached. This simplifies the determination of the desired ratio when the absolute values of the responses are varied.

The idea of having a monitor receive the coating faster (e. g. by being nearer the source of evaporation in vacuum distillation processes) is directly applicable to the present invention, the differences being compensated by proper adjustment of the spectral responses of the photoelectric cells or by proper selection of the ratio at which to terminate the coating operation.

The invention will be fully understood when read in connection with the accompanying drawing in which:

Fig. 1 is a perspective view partly schematic illustrating the preferred embodiment of the invention, Fig. 2 shows an electrical circuit alternative to that shown in Fig. 1.

Fig. 3 is the cross section of a lens system having non-reflecting coatings on the mount as well as on the lens elements.

In Fig. 1 a vacuum bell jar 10 is carried on a base plate 11 and inside of the evacuated chamber there is a pyramidal table support 12 carried on legs 13 having apertures through the table portion to permit coating of lenses 14 by distillation of a fluoride from below. The fluoride is carried in a pot 16 and is heated to the evaporation point by a filament 15, which is connected in the usual way through posts 17, wire 18 and a switch 19 to an electric power supply. Over one of the apertures in the table 12, there is placed a prism 20 the lower surface of which is to be the monitoring surface for determining the thickness of coating on the lenses.

Light from a lamp 21, which contains wavelengths both longer and shorter than the minimum intensity wavelength of light reflected from layers of the desired coating thickness, illuminates the lower surface of the prism 20 by reflection. This light is then reflected from the lower surface to photoelectric cells 24 and 25, the light respectively passing through filters 22 and 23 whose colors are different, one being predominately longer wavelength than the minimum intensity wavelength of the hue and the other being predominately shorter wavelength than the minimum intensity wavelength. The filter 22 is a blue filter in this particular example and the filter 23 is a red filter. The cells 24 and 25 are respectively responsive to blue and red light. Power from a battery 30 is supplied to both cells when the switch 31 is closed. The output of the cells are read respectively by meters 32 and 33. Before the coating starts, the reflectance through both filters is fairly high and the readings on the meters 32 and 33 are both high. As the coating starts the meter 32 reads lower and lower and the reading on the meter 33 follows it down, lagging somewhat. Soon a minimum is reached with respect to the photocell 24 and then the reading on the meter 32 starts up. Then when the ratio of the meter readings 32 and 33 has reached a predetermined value, the coating operation is terminated. If the filters 22 and 23 are properly chosen or if the output circuits of the cells 24 and 25 are properly balanced, the predetermined ratio can be made to the unity. In this case the coating operation is terminated by turning off the current through filament 15 as soon as the reading of the meter 32 passes through a minimum and comes up to equal that of the meter 33.

As shown in Fig. 2 the two meters may be superimposed. Power from the photocells is provided from a battery 40 and the circuits are balanced by adjustment of rheostats 44 and 45. As before, the needle 42 moves downward from the uncoated maximum as indicated on the scale 41, until a minimum point is reached at which time it starts upward again, the coating being terminated when the reading matches that of the needle 43 which corresponds to the photocell 25.

This coating operation is particularly useful when coating opaque materials. It is common practice to make all parts of an optical system such as the mount, diaphragm, etc., dull black in order to prevent reflection of unwanted light into the system or through the system. However, the usual black finish is not too satisfactory and according to the present invention the reflectance can be further reduced by an optical interference layer on top of the lacquer. Thus the present invention is particularly useful for controlling the thickness of the interference layers on the lens mount or other opaque part of the system.

In Fig. 3 an optical system is made up of lens elements 60 whose surfaces may or may not be coated to reduce reflection. This optical system is carried in a mount 61 whose surfaces 62 are coated according to the invention with a low reflectance optical interference layer to minimize stray light entering the system. It has also been found advisable to reduce reflection from the front surface 63 of a diaphragm (shown diagrammatically) and sometimes even to reduce the reflection from the rear surface 64 of this diaphragm. Reflections from the diaphragm surfaces are troublesome only in combination with minor reflections from one or more of the refracting surfaces of the lens itself. That is, the diaphragm reflections are troublesome only when multiple internal reflections occur. The coating of opaque elements is illustrated in Fig. 1 wherein a flat shutter 50 and a conical shutter 51 are coated. Surfaces oblique to the incidence of the coating material such as the inner surfaces of the conical shutter 51 require a longer coating time to reach optimum conditions, but of course some advantages are gained even by coatings somewhat thinner than optimum.

We claim:

The method of depositing on surfaces, optical interference coatings with a preselected minimum-intensity-wavelength, comprising supporting an object whose surface is to be coated, depositing the coating material gradually on said surface, illuminating a portion of the surface with light including wavelengths both longer and shorter than the minimum intensity wavelength, receiving the light specularly reflected from the surface on a pair of photoelectric means responsive predominately to said longer and shorter wavelengths respectively, continuing the depositing until the response of the shorter wavelength photoelectric means reaches a minimum and starts to increase and then terminating the depositing when the ratio of the two photoelectric responses reaches the value at which the spectral intensity of the specularly reflected light has its minimum at said preselected wavelength.

DANIEL B. McRAE.
JOHN H. McLEOD.

REFERENCES CITED

The following references are of record in the file of this patent:

UNITED STATES PATENTS

| Number | Name | Date |
|---|---|---|
| 2,220,861 | Blodgett | Nov. 5, 1940 |
| 2,239,452 | Williams et al. | Apr. 22, 1941 |
| 2,338,234 | Dimmick | Jan. 4, 1944 |
| 2,377,268 | Rinia | May 29, 1945 |
| 2,382,439 | Osborn | Aug. 14, 1945 |
| 2,399,860 | Dimmick | May 7, 1946 |
| 2,408,614 | Dimmick | Oct. 1, 1946 |